(12) United States Patent
Yamanaka et al.

(10) Patent No.: US 10,516,790 B2
(45) Date of Patent: Dec. 24, 2019

(54) INSPECTION APPARATUS, IMAGE FORMING SYSTEM, INSPECTION METHOD, AND PROGRAM

(71) Applicant: KONICA MINOLTA, INC., Chiyoda-ku, Tokyo (JP)

(72) Inventors: Kenji Yamanaka, Hachioji (JP); Makoto Oki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/201,675

(22) Filed: Nov. 27, 2018

(65) Prior Publication Data

US 2019/0174013 A1  Jun. 6, 2019

(30) Foreign Application Priority Data

Dec. 5, 2017  (JP) .................................. 2017-233308

(51) Int. Cl.
*H04N 1/00* (2006.01)
*G03G 15/00* (2006.01)

(52) U.S. Cl.
CPC ..... *H04N 1/00092* (2013.01); *G03G 15/5062* (2013.01); *H04N 1/00037* (2013.01); *H04N 1/00045* (2013.01); *G03G 15/55* (2013.01)

(58) Field of Classification Search
CPC ........... H04N 1/00092; H04N 1/00037; H04N 1/0004; G03G 15/5062; G03G 15/55
USPC ........................ 358/1.1–1.18, 406
See application file for complete search history.

(56) References Cited

U.S. PATENT DOCUMENTS

| | | | |
|---|---|---|---|
| 9,185,240 B2 | 11/2015 | Kojima et al. | |
| 9,524,545 B2 | 12/2016 | Fukase | |
| 9,536,297 B2 | 1/2017 | Araki et al. | |
| 2003/0076518 A1* | 4/2003 | Miyake | H04N 1/00002 358/1.9 |

(Continued)

FOREIGN PATENT DOCUMENTS

| | | |
|---|---|---|
| JP | H06201611 A | 7/1994 |
| JP | 2010217028 A | 9/2010 |
| JP | 2013186562 A | 9/2013 |

OTHER PUBLICATIONS

Extended European Search Report (EESR) dated Apr. 5, 2019 issued in European Application No. 18210410.9.

*Primary Examiner* — Gabriel I Garcia

(74) *Attorney, Agent, or Firm* — Holtz, Holtz & Volek PC

(57) ABSTRACT

There is provided an inspection apparatus that inspects a printed material for a smudge, in accordance with an inspection image formed by reading a printed material, a print image being formed on the printed material, the inspection apparatus including: a hardware processor that: performs position adjustment between a reference image serving as an inspection standard for the print image, and the inspection image; detects a region presumed to be a smudge on the printed material as a smudge candidate region, in accordance with a difference image generated from the reference image and the inspection image after the position adjustment; and determines whether the smudge candidate region is a false smudge candidate region resulting from a positional shift of an object in the print image, in accordance with the smudge candidate region detected by the hardware processor and difference data characteristics of the difference image.

23 Claims, 9 Drawing Sheets

(56) References Cited

U.S. PATENT DOCUMENTS

| | | | |
|---|---|---|---|
| 2013/0114102 A1* | 5/2013 | Yamamoto | G06K 9/3216 |
| | | | 358/1.14 |
| 2013/0148143 A1* | 6/2013 | Ooyanagi | H04N 1/00015 |
| | | | 358/1.12 |
| 2013/0335753 A1* | 12/2013 | Okamoto | G06F 3/1211 |
| | | | 358/1.2 |
| 2014/0226189 A1 | 8/2014 | Kojima et al. | |
| 2014/0341437 A1 | 11/2014 | Araki et al. | |
| 2015/0003845 A1* | 1/2015 | Morishita | G03G 15/5062 |
| | | | 399/15 |
| 2015/0078627 A1 | 3/2015 | Fukase | |
| 2016/0335760 A9 | 11/2016 | Araki et al. | |
| 2018/0293732 A1* | 10/2018 | Oki | G06T 7/11 |

\* cited by examiner

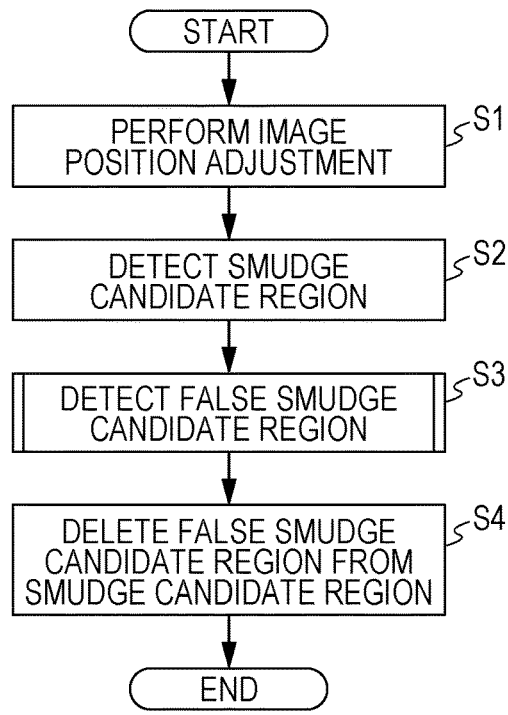
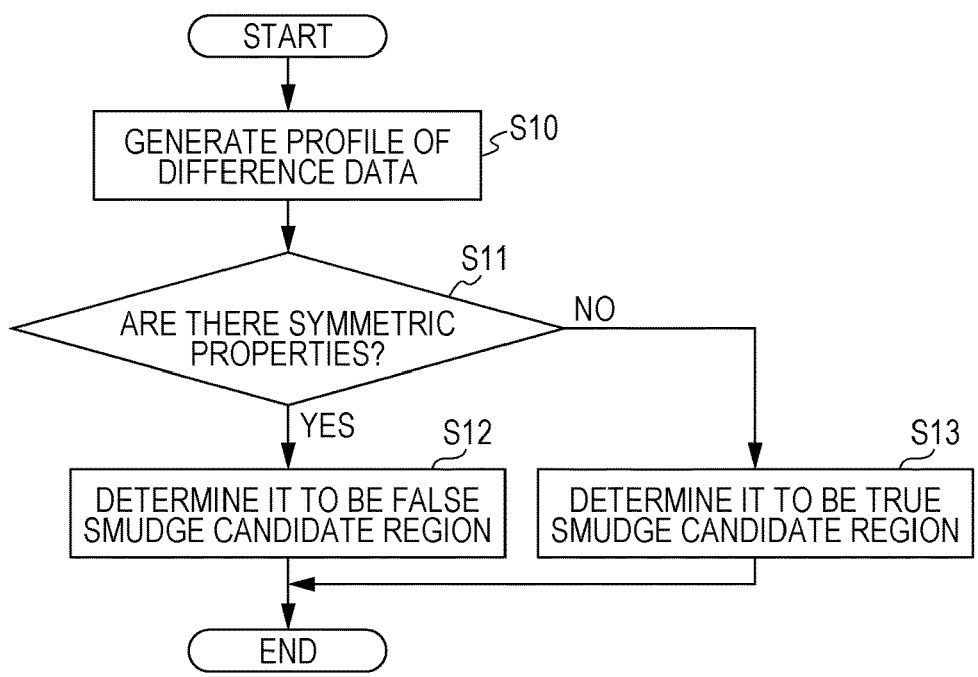

INSPECTION APPARATUS, IMAGE FORMING SYSTEM, INSPECTION METHOD, AND PROGRAM

BACKGROUND

Technological Field

The present invention relates to an inspection apparatus, an image forming system, an inspection method, and a program.

Description of the Related Art

There is a conventional known technique for inspecting a printed material for smudges in accordance with an inspection image formed by optically reading a printed material, to evaluate the quality of the printed material output from an image forming apparatus, or more specifically, the quality of the print image formed on the printed material. Here, a smudge on a printed material means an element on a printed material that is not seen in a legitimate print image.

For example, JP 06-201611 A discloses a method of detecting a defect of a sheet-like printed material. By this method, a multi-tone area image of the surface to be inspected is produced by reading a sheet-like printed material with a line sensor. The density level of each portion in the multi-tone area image is then compared with the density level of each portion in a reference master image, and each portion having a larger density level difference than an allowable value is determined to be a defective portion.

Meanwhile, JP 2013-186562 A discloses an image inspection apparatus that conducts an inspection by checking the inspection target image that is a read image obtained by reading an image formed on a paper surface, against a master image. In this image inspection apparatus, an entire image is divided into blocks, and first position adjustment is performed in regions in an image peripheral portion. The amount of the positional shift of each block in the inspection target image is calculated in accordance with the result of the position adjustment. While the blocks in the inspection target image shifted in accordance with the shift amounts and the blocks in the master image are being slightly moved, position adjustment is performed, followed by comparisons and checking. In this case, a predetermined block is selected from the image, second position adjustment is performed by recalculating the amount of the positional shift of the selected block, and the amount of the positional shift of each block in the inspection target image is corrected in accordance with the result of the second position adjustment.

According to the technique disclosed in JP 06-201611 A, the multi-tone area image on the inspection target surface and the master image are images obtained through printing and reading. Therefore, due to some influence during the image formation process and the conveyance process, a positional shift (such as a difference in the position or the angle of an object in the images) might occur between the multi-tone area image on the inspection target surface and the master image. To counter this, the position in the horizontal direction or the rotation angle is corrected in a conventional case. For example, according to a technique disclosed in JP 2013-186562 A, position adjustment is performed after an entire image is divided into blocks. In this manner, it is possible to cope with meandering of a printed material during conveyance.

In the case of a character or the like among the objects in an image, however, the elements constituting an object are very small, and therefore, there is a limit to position adjustment. Furthermore, position adjustment depends on the conveyance speed of the printed material, the inclination of the printed material during conveyance, and the like. Therefore, it is difficult for a user to manually perform correction. For this reason, a positional shift between two images cannot be completely eliminated by a conventional position adjustment technique, and a portion affected by the positional shift might be determined to be a smudge. As a result, there is a possibility that the accuracy of the inspection for smudges on printed materials becomes lower.

SUMMARY

The present invention has been made in view of the above circumstances, and an object of the present invention is to reduce the decrease in accuracy of inspection for smudges on printed materials even in a case where there is a positional shift between images.

To achieve the abovementioned object, according to an aspect of the present invention, there is provided an inspection apparatus that inspects a printed material for a smudge, in accordance with an inspection image formed by reading a printed material, a print image being formed on the printed material, and the inspection apparatus reflecting one aspect of the present invention comprises: a hardware processor that: performs position adjustment between a reference image serving as an inspection standard for the print image, and the inspection image; detects a region presumed to be a smudge on the printed material as a smudge candidate region, in accordance with a difference image generated from the reference image and the inspection image after the position adjustment; and determines whether the smudge candidate region is a false smudge candidate region resulting from a positional shift of an object in the print image, in accordance with the smudge candidate region detected by the hardware processor and difference data characteristics of the difference image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a flowchart showing a process according to a printed material inspection method;

FIG. 7 is a flowchart specifically showing the process in step 3;

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
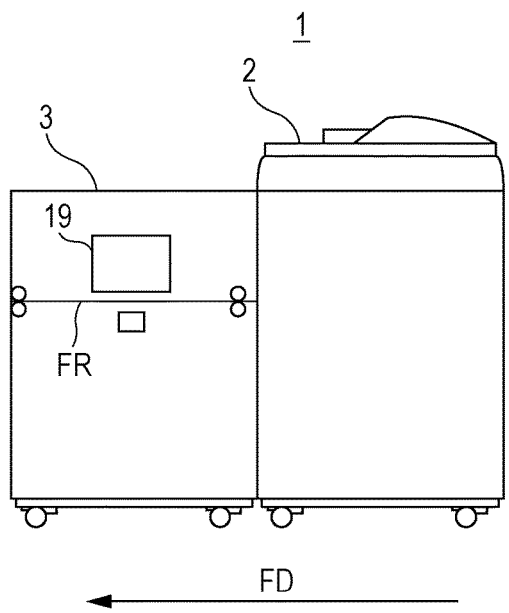
FIG. 1 is an explanatory diagram schematically showing the configuration of an image forming system according to a first embodiment.

FIG. 1 is an explanatory diagram schematically showing the configuration of an image forming system 1 according to this embodiment. The image forming system 1 according to this embodiment is formed mainly with an image forming apparatus 2 and an inspection apparatus 3. The image forming apparatus 2 and the inspection apparatus 3 are continuously arranged in this order in the direction from the upstream side toward the downstream side, which is the paper sheet (printed material) conveying direction FD.

The image forming apparatus 2 forms a print image on a paper sheet, and outputs the paper sheet on which the print image is formed as a printed material. The image forming apparatus 2 has a function of executing jobs such as a copy job of optically reading a document and outputting a printed material in accordance with the read image data, and a print job of outputting a printed material in accordance with image data output from an external device (a hard disk device, a server, a personal computer, or the like).

Upon receipt of the printed material output from the image forming apparatus 2, the inspection apparatus 3 reads the printed material. The printed material is inspected for smudges in the image read by the inspection apparatus 3 (the image will be hereinafter referred to as the "inspection image").

Figure 2:
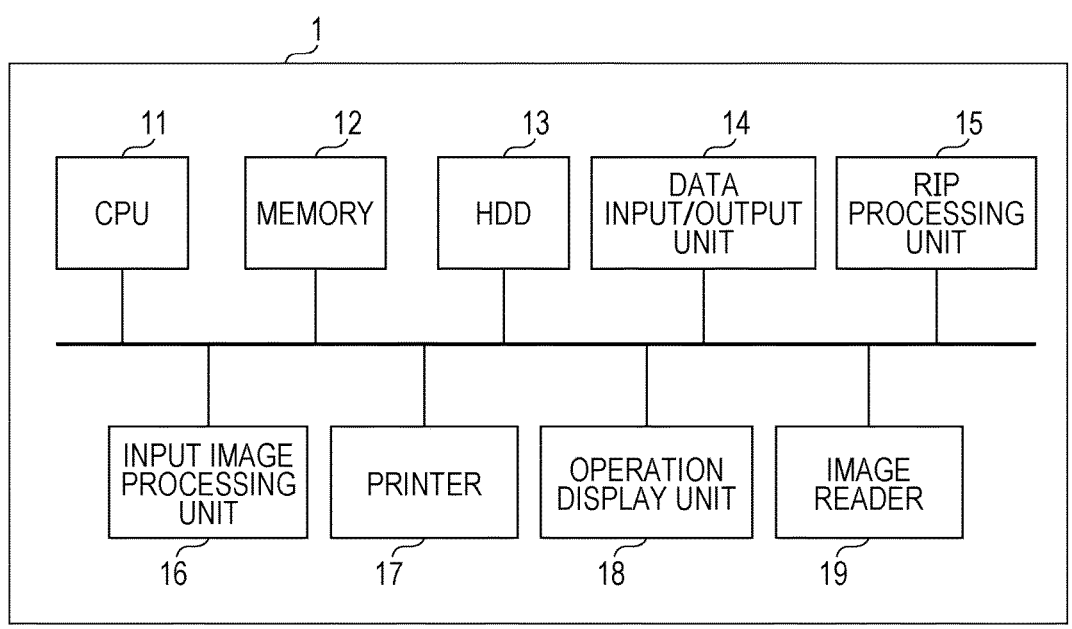
FIG. 2 is a block diagram showing the configuration of the image forming system according to the first embodiment.

FIG. 2 is a block diagram showing the configuration of the image forming system 1 according to this embodiment. The image forming system 1 includes a central processing unit (CPU) 11 that comprehensively controls operation of the image forming system 1 including the image forming apparatus 2 and the inspection apparatus 3. A memory 12, a hard disk drive (HIM)) 13, a data input/output unit 14, a RIP processing unit 15, an input image processing unit 16, a printer 17, an operation display unit 18, and an image reader 19 are connected to the CPU 11 via a bus. The CPU 11, the memory 12, the hard disk drive 13, the data input/output unit 14, the RIP processing unit 15, the input image processing unit 16, the printer 17, and the operation display unit 18 are mounted in the image forming apparatus 2, and the image reader 19 is mounted in the inspection apparatus 3.

The CPU 11 is based on an operating system (OS), and executes various kinds of programs and the like thereon. A program for activating the image forming system 1 is stored in the memory 12, and, according to this program, the CPU 11 activates the image forming system 1. After that, the CPU 11 (a processor) loads the program stored in the hard disk drive 13 into the memory 12, and performs various kinds of processes according to the loaded program, to achieve the various functions of the image forming system 1.

The memory 12 is formed with a random access memory (RAM) or the like. A RAM is a working storage area in which various kinds of data are temporarily stored when the CPU 11 performs a process in accordance with the program.

The hard disk drive 13 is a large-capacity nonvolatile storage device, and stores an OS program, various kinds of job histories, and the like. The hard disk drive 13 also stores the program to be executed by the CPU 11 to cause the image forming apparatus 2 and the inspection apparatus 3 to operate in accordance with their functions. The hard disk drive 13 further stores the data necessary for program execution and management of the image forming apparatus 2.

The data input/output unit 14 is a unit that performs inputting/outputting of data, and inputs/outputs data to/from the memory 12 or the hard disk drive 13.

The RIP processing unit 15 generates intermediate data by translating language-form image data created by an external device, and generates print image data in the bitmap format for each page by performing a rendering process (this series of processes is referred to as a RIP process (a rasterization process)). The information calculated by the RIP processing unit 15 corresponds to the image information for forming the print image.

The input image processing unit 16 performs various kinds of image processes necessary for image formation on the image data (including the print image data), to generate image data subjected to image processing. The input image processing unit 16 stores the image data into the memory 12 or the hard disk drive 13 via the data input/output unit 14.

The printer 17 forms the image (the print image) corresponding to the image data on a paper sheet, and outputs the printed material having the print image formed thereon. The printer 17 according to this embodiment is designed to use an electrophotographic process, for example, and includes a conveyance device including conveyance rollers, a photosensitive drum, a charging device, an exposure device, a developing device, a transfer/separation device, a cleaning device, a fixing device, and the like. However, the printer 17 may be designed to use some other method, such as an inkjet method.

The operation display unit 18 is an operation unit that accepts an input corresponding to a user operation, and includes a display, a touch panel capable of inputting information in accordance with information displayed on the display, and various kinds of switches and buttons, for example. Information about the operation performed on the operation display unit 18 is input to the CPU 11. By operating the operation display unit 18, the user can issue a print job, or make various kinds of settings. Under the control of the CPU 11, the operation display unit 18 also functions as a display unit that displays various kinds of information to the user.

The image reader 19 optically reads the printed material conveyed in a conveyance path FR, to generate an inspection image (see FIG. 1). To read printed materials, the image reader 19 is positioned to face the conveyance path FR. The image reader 19 stores the generated inspection image into the memory 12 or the hard disk drive 13 via the data input/output unit 14. For example, the image reader 19 includes: a light source that emits light onto a document; a line image sensor that receives tight reflected from the document and reads one line of the document in the width direction; an optical system formed with a lens or a mirror that guides light reflected from the printed material toward the line image sensor to form an image; and an AD converter that converts an analog image signal output from the line image sensor into digital image data.

Figure 3:
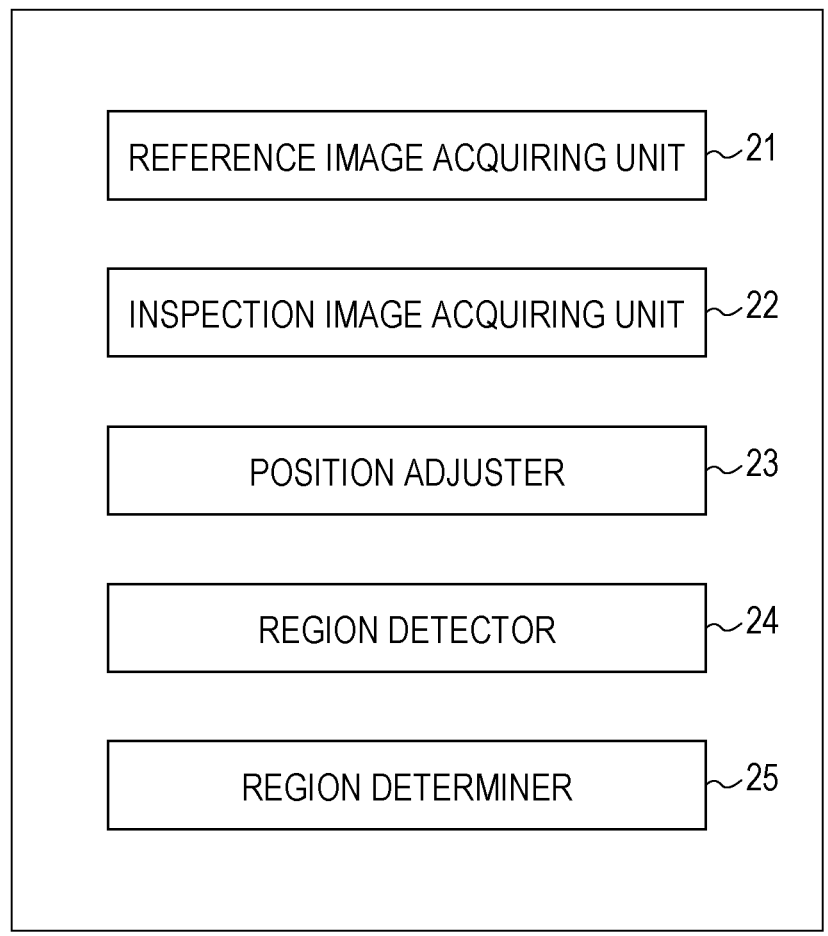
FIG. 3 is an explanatory diagram for explaining the functions of the CPU.

In a case where the CPU 11 is viewed in terms of functions in the image forming system 1 according to this embodiment, the CPU 11 includes a reference image acquiring unit 21, an inspection image acquiring unit 22, a position adjuster 23, a region detector 24, and a region determiner 25. FIG. 3 is an explanatory diagram for explaining the functions of the CPU 11.

The reference image acquiring unit 21 acquires a reference image that serves as the inspection standard for printed materials. The reference image is an image reflecting the legitimate print image. For example, the reference image acquiring unit 21 can acquire print image data generated by the RIP processing unit 15 as the reference image. However, the reference image acquiring unit 21 can acquire the reference image by some other method, such as acquiring the reference image from an external device.

The inspection image acquiring unit 22 acquires an inspection image from the image reader 19.

The position adjuster 23 adjusts the positions of the two images so that an object (a character, a line, a figure, or the like) in the reference image is matched with the object in the inspection image.

The region detector 24 generates a difference image from the reference image and the inspection image after the position adjustment, and, in accordance with the generated difference image, detects a region presumed to be a smudge on the printed material as a smudge candidate region. A smudge on a printed material means an element on a printed material that is not seen in the legitimate print image.

In accordance with the smudge candidate region detected by the region detector 24 and the difference data characteristics of the difference image, the region determiner 25 determines whether the smudge candidate region is a false smudge candidate region resulting from a positional shift of the object in the print image. As described above, the positions of the two images are adjusted to each other by the position adjuster 23. However, a positional shift of an object is caused by local distortion, deformation, or the like in the print image.

These functions are achieved by the CPU 11 executing a program, but may be achieved by hardware including circuits and the like.

Figure 4A:
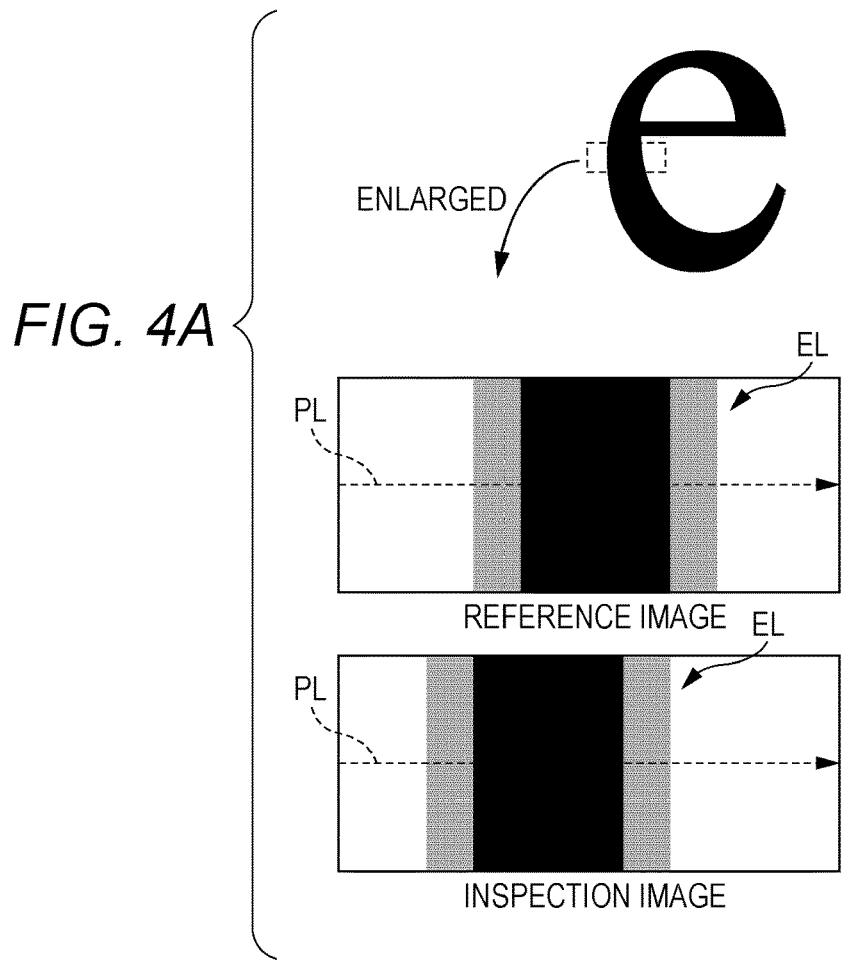
FIGS. 4A and 4B are explanatory diagrams for explaining the concept of a printed material inspection method.
Figure 4B:
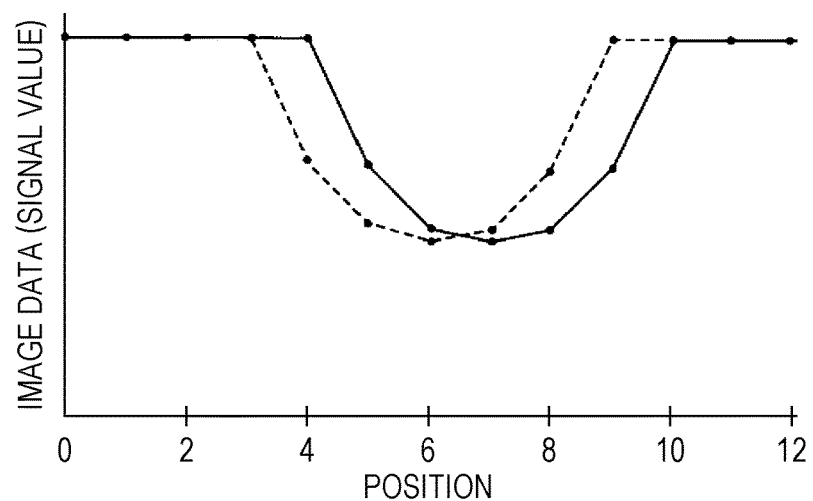

Before a printed material inspection method to be implemented in the image forming system 1 is described, the concept of the inspection method is now described. FIGS. 4A and 4B are explanatory diagrams for explaining the concept of the printed material inspection method. FIG. 4A is a diagram for explaining a positional shift of an object. FIG. 4B is an explanatory diagram showing the profiles of image data along a profile line PL.

An object, particularly a character, a table, or the like, in the reference image is formed with lines as elements (the same applies to the inspection image, and these lines will be hereinafter referred to as "element tines"). Even if the positions of the reference image and the inspection image are adjusted so that the objects in the two images are matched with each other, the element lines are very thin, and therefore, a positional shift might locally occurs at such a portion. The images shown in FIG. 4A are images of predetermined regions that correspond to each other in position in the reference image and the inspection image after the position adjustment. In the predetermined regions, part of an element line EL of a character (the alphabetical character "e", for example) is included, hut this element line EL has a positional shift. In the example shown in the drawing, the element line EL of the inspection image has shifted to the left by one pixel, compared with the element line EL of the reference image.

A linear profile line PL that extends across the element line EL, or a profile line PL that extends in the horizontal direction is set in each image in the example shown in FIG. 4A. FIG. 4B shows the profiles of image data (the signal values (luminance values) of pixels) along the profile line PL. In FIG. 4B, the solid line corresponds to the profile of the reference image data, and the dashed line corresponds to the profile of the inspection image data. Although the waveforms of the profiles of the respective sets of image data are the same, the profile of the inspection image data has a waveform shifted leftward from the profile of the reference image data.

Figure 5A:
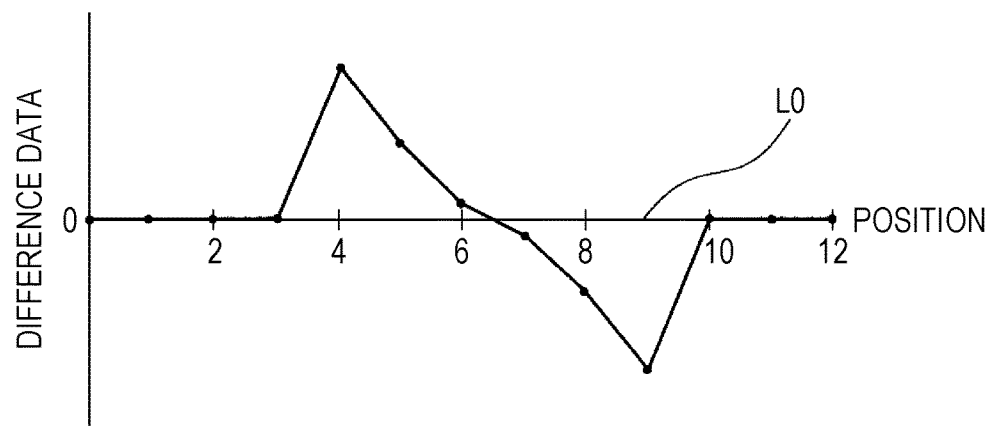
FIGS. 5A and 5B are explanatory diagrams showing difference data, and absolute value data indicating the difference data with absolute values.
Figure 5B:
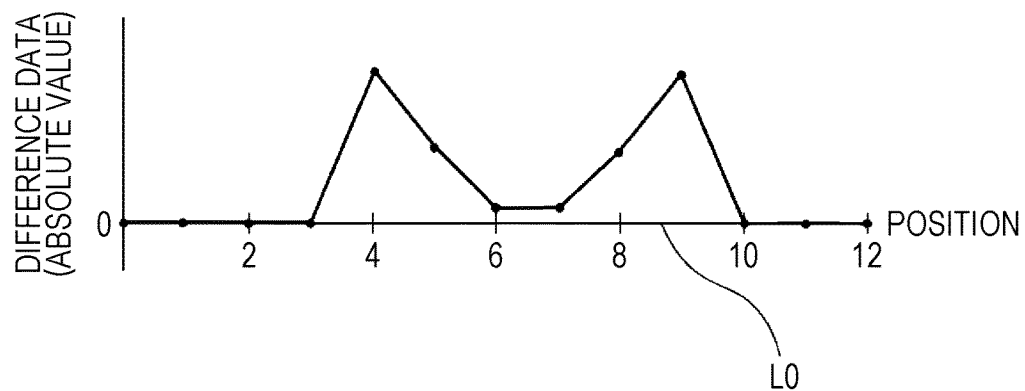

FIGS. 5A and 5B are explanatory diagrams showing the difference data, and absolute value data indicating the difference data with absolute values. Next, the difference image showing the difference between the reference image and the inspection image is described. The difference image is obtained by calculating the difference between image data at positions (pixels) corresponding to each other after position adjustment is performed on the reference image and the inspection image. In this embodiment, the difference image is generated by subtracting the inspection image from the reference image.

Where the profile of the difference data along the above mentioned profile line PL is generated in this difference image, the profile is as shown in FIG. 5A. As can be seen from this profile, in a case where there is a positional shift, a positive peak and a negative peak appear at the positions corresponding to the two ends of the element line EL. Meanwhile, where the absolute values of the profile of the difference data are obtained (these absolute values will be hereinafter referred to as the "absolute value data"), the profile of the absolute value data is as shown in FIG. 5B. This profile has a waveform symmetrical with respect to the coordinate position (6.5) that is the intersection point between the zero difference line L0, which is the line on which the difference data is "0", and the profile of the difference data (FIG. 5B).

As described above, in a false smudge candidate region resulting from a positional shift, the profile of the difference data has a peak on the positive side and a peak on the negative side, with the zero difference line L0 being the boundary. This profile is a waveform symmetrical with respect to the intersection point (coordinate position 6.5) between the profile and the zero difference line L0 (see FIG. 5A). In other words, in the case of a false smudge candidate region resulting from a positional shift, the profile has peaks that appear on the opposite sides of the element line EL, have symmetric properties, and protrude in the opposite directions from each other.

If there is neither a positional shift of an object nor a smudge, the difference data of the difference image is flat (zero). In a case where there is a positional shift of an object or a smudge, on the other hand, peaks appear in the profile of the difference data. Particularly, in a case where peaks are caused by a positional shift of an object, predetermined data characteristics or symmetric properties appear in the profile. Therefore, the profile of difference data is generated from a smudge candidate region, and a check is made to determine whether the profile has symmetric properties. Thus, it is possible to determine whether the smudge candidate region is a false smudge candidate region. In this manner, among smudge candidate regions detected from difference data, each true smudge candidate region can be distinguished from a false smudge candidate region resulting from a positional shift.

In a case where both peaks are regarded as smudge candidate regions, the number of candidates doubles. Therefore, only one peak (only the peak at the left end of the element line EL, for example) is regarded as a smudge candidate region in this embodiment.

The following is a description of operation of the image forming system 1 according to this embodiment, or a description of a printed material inspection method. FIG. 6 is a flowchart showing a process according to the printed material inspection method. The process shown in this flowchart is to be performed by the CPU 11, with the trigger being execution of a print job accompanied by a printed material output, for example. In the description below, a method of inspecting one printed material is explained. However, in a case where a print job is to output more than one printed material, every time a printed material is output, the process according to the process according to this inspection method is performed on the output printed material.

First, in step 1 (S1), the position adjuster 23 performs position adjustment on the reference image and the inspection image. The reference image acquiring unit 21 acquires the reference image, which is print image data or the like generated by the RIP processing unit 15 along with a print job. Meanwhile, the inspection image acquiring unit 22 acquires the inspection image generated after the image reader 19 of the inspection apparatus 3 reads the printed material to be inspected that has been output from the image forming apparatus 2. The position adjuster 23 reads the reference image acquired by the reference image acquiring unit 21 and the inspection image acquired by the inspection image acquiring unit 22. Using a known image processing technique, the position adjuster 23 then adjusts the positions of the two images so that an object (a character, a line, a figure, or the like) in the reference image is matched with the object in the inspection image.

In step 2 (S2), the region detector 24 generates a difference image from the reference image and the inspection image after the position adjustment, and, in accordance with this difference image, detects a region presumed to be a smudge on the printed material as a smudge candidate region. Specifically, when extracting the difference data over the entire region of the difference image in predetermined order, the region detector 24 compares the difference data with a smudge determination value. The smudge determination value defines a difference data threshold value for determining a smudge, and is set through experiments and simulations. Through the data comparison, the region detector 24 detects a region in which the difference data is equal to or greater than the smudge determination value as a smudge candidate region.

In step 3 (S3), in accordance with the smudge candidate region detected by the region detector 24 and the difference data characteristics of the difference image, the region determiner 25 determines whether the smudge candidate region is a false smudge candidate region. If more than one smudge candidate region is detected in step 2, this determination is made for each smudge candidate region. As a result, the false smudge candidate region(s) is (are) identified from among the smudge candidate regions. Here, a false smudge candidate region is a region that is detected as a smudge candidate region but is not actually a smudge on the printed material. Such a false smudge candidate region is caused by a local positional shift of an object in a print image.

FIG. 7 is a flowchart specifically showing the process in step 3. In step 10 (S10), the region determiner 25 generates the profile of the difference data.

Figure 8A:
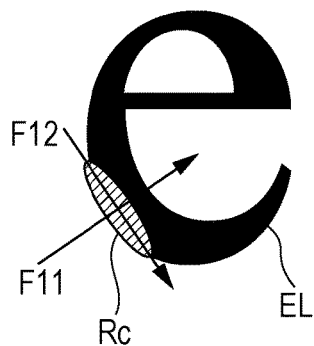
FIGS. 8A and 8B are explanatory diagrams showing directions of profile generation.
Figure 8B:
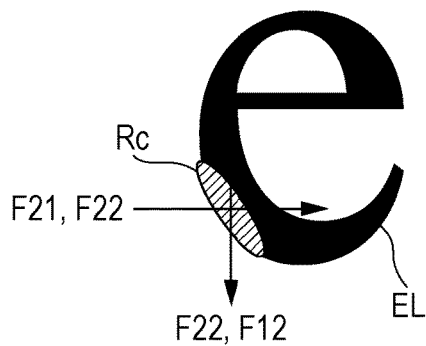

First, the region determiner 25 sets two different directions that overlap with at least part of the smudge candidate region. FIGS. 8A and 8B are explanatory diagrams showing directions of profile generation. FIGS. 8A and 8B show a character as an object in the inspection image, or specifically, the alphabetical character "e". For example, in a case where there is a local positional shift, a smudge candidate region (indicated by "Rc" in the drawings) is detected at an edge of an element line EL of "e".

First, a first method is shown in FIG. 8A. According to this method, a normal direction F11 and a tangential direction F12 with respect to the element line EL (the outer edge of the element line EL) of the character "e" are set to overlap with at least part of the smudge candidate region Rc. The normal direction F11 with respect to the element line EL corresponds to the direction in which the length of the overlap between the profile and the element line EL is minimized. Likewise, the tangential direction F12 with respect to the element line EL corresponds to a direction perpendicular to the direction in which the length of the overlap between the profile and the element line EL is minimized.

A second method is shown in FIG. 8B. According to this method, two directions F21 and F22 are set along the two-dimensional direction that defines the image, so as to overlap with at least part of the smudge candidate region Rc (these two directions F21 and F22 will be hereinafter referred to as the long-side direction F21 and the short-side direction F22 of the image, for convenience sake). As the inspection image is read while the printed material is being conveyed, the long-side direction F21 and the short-side direction F22 of the image correspond to the conveying direction FD and the width direction perpendicular to the conveying direction FD. However, the orientation of a printed material at the time of conveyance varies with the size of the printed material. Therefore, the conveying direction FD or the width direction does not necessarily coincide with the long-side direction F21 or the short-side direction F22 of the image, and the relationship between the two is interchangeable.

The region determiner 25 generates the profile of the difference data in accordance with the two directions set in this manner. At this stage, the range of the profile generation is determined by the size of a character that is an object in the print image or by the line width of the object. For example, the larger the character size is, or the greater the line width of the object is, the wider the range of the profile generation is.

In generating the profile, it is necessary to recognize the object in the print image. Therefore, the region determiner 25 uses image information for forming a print image. Here, the image information generated in the RIP processing unit 15 can be used, for example. However, the use of the image information is not limited to this technique.

Referring back to FIG. 7, in step 11 (S11), the region determiner 25 determines whether the profile of the difference data has symmetric properties. This determination is made for each of the profiles of the difference data set in the two directions. The symmetric properties of the profiles are determined by one of the following three techniques, for example.

Figure 9A:
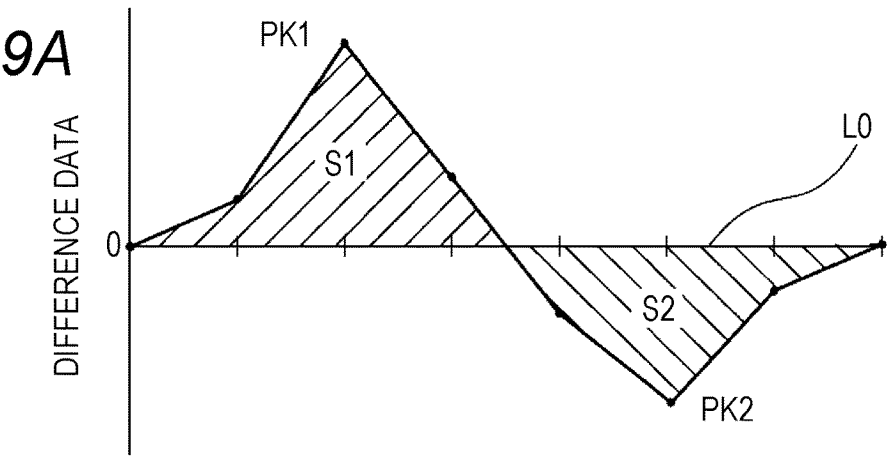
FIGS. 9A and 9B are diagrams for explaining an example of a technique of determining symmetric properties.
Figure 9B:
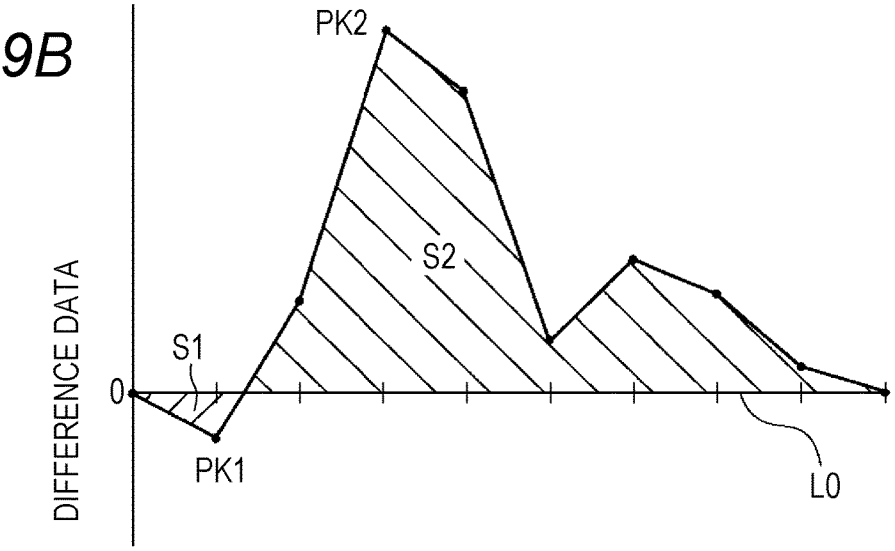

FIGS. 9A and 9B are diagrams for explaining an example of a technique of determining symmetric properties. FIG. 9A shows an example profile in which symmetric properties are recognized. FIG. 9B shows an example profile in which symmetric properties are not recognized. A first technique is to determine symmetric properties by comparing areas. As described above, symmetric properties appear in the profile of the difference data in a case where there is a positional shift. Therefore, the region determiner 25 calculates the area S1 of a first closed region defined by the zero difference line L0 and the profile having the peak PK1 corresponding to a smudge candidate region. Likewise, the region determiner 25 calculates the area. S2 of a second closed region defined by the zero difference line L0 and the profile having a peak PK2 that appears on the opposite side of the element line EL and protrudes in the opposite direction. In a case where symmetric properties are recognized in the profile, the areas S1 and S2 of the two closed regions are the same, or fall within a predetermined error range. Therefore, the region determiner 25 determines the symmetric properties of the profile of the difference data, in accordance with the comparison between the areas S1 and S2 of the closed regions defined by the profile of the difference data, with the boundary being the zero difference line L0. In the comparison between the areas S1 and S2 of the two closed regions, the area ratio (S1/S2) between the closed regions is used, for example.

Figure 10A:
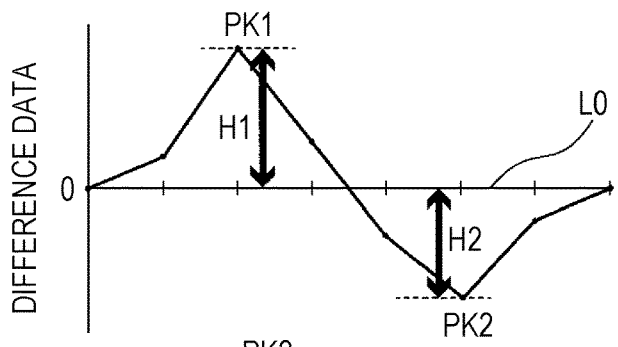
FIGS. 10A and 10B are diagrams for explaining an example of a technique of determining symmetric properties.
Figure 10B:
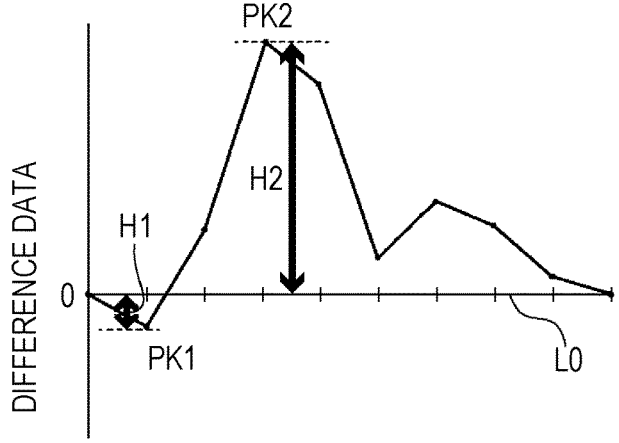

FIGS. 10A and 10B are diagrams for explaining an example of a technique of determining symmetric properties. FIG. 10A shows an example profile in which symmetric properties are recognized. FIG. 10B shows an example profile in which symmetric properties are not recognized. A second technique is to determine symmetric properties by comparing the heights of peaks. As described above, symmetric properties appear in the profile of the difference data in a case where there is a positional shift. Therefore, the region determiner 25 detects the peak height H1 of the peak PK1 corresponding to a smudge candidate region. Likewise, the region determiner 25 detects the peak height H2 of a peak PK2 that appears on the opposite side of the element line EL, and protrudes in the opposite direction. In a case where symmetric properties are recognized in the profile, the peak heights H1 and H2 of the two peaks PK1 and PK2 are the same, or fall within a predetermined error range. Therefore, the region determiner 25 compares the peak heights H1 and H2 of the two peaks PK1 and PK2, to determine whether the profile has symmetric properties. In the comparison between the two peak heights H1 and H2, it is possible to use the peak height ratio (H1/H2) or the like.

Figure 11A:
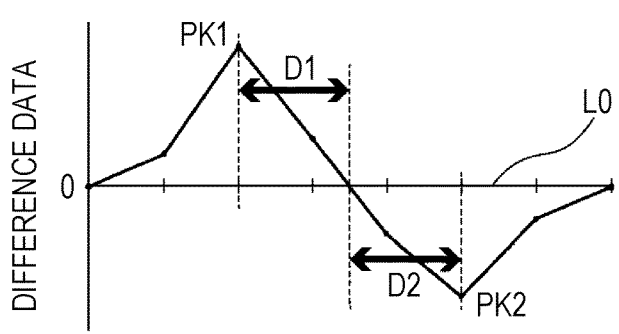
FIGS. 11A and 11B are diagrams for explaining an example of a technique of determining symmetric properties.
Figure 11B:
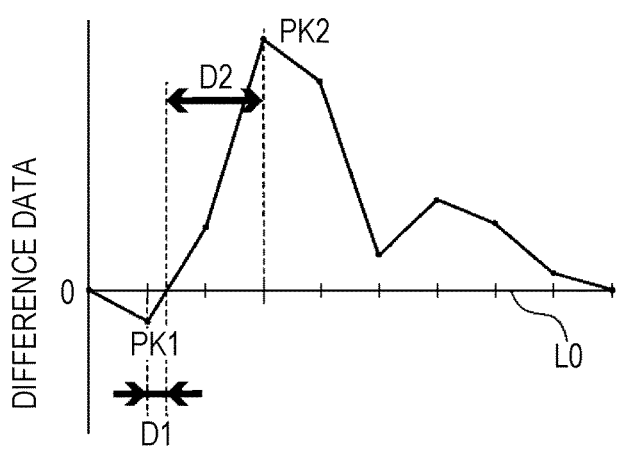

FIGS. 11A and 11B are diagrams for explaining an example of a technique of determining symmetric properties. FIG. 11A shows an example profile in which symmetric properties are recognized. FIG. 11B shows an example profile in which symmetric properties are not recognized. A third technique is to determine symmetric properties by comparing the distances to peaks. As described above, symmetric properties appear in the profile of the difference data in a case where there is a positional shift. Therefore, the region determiner 25 detects the distance D1 from the base point at the intersection point between the profile of the difference data and the zero difference line, to the peak corresponding to a smudge candidate region. Likewise, the region determiner 25 detects the distance D2 from the base point at the intersection point between the profile of the difference data and the zero difference line, to a peak that appears on the opposite side of the element line EL and protrudes in the opposite direction. In a case where symmetric properties are recognized in the profile, the two distances D1 and D2 are the same, or fall within a predetermined error range. Therefore, the region determiner 25 compares the distances D1 and D2 to the two peaks, to determine whether the profile have symmetric properties. In the comparison between the distances D1 and D2 to the two peak positions, the ratio between the distances to the two peaks (D1/D2) or the like is used.

Referring back to FIG. 7, if the result of the determination in step 11 is positive, or if symmetric properties are recognized in at least one profile, the process moves on to step 12 (S12). If the result of the determination in step 11 is negative, or if symmetric properties are not recognized in any profile, on the other hand, the process moves on to step 13 (S13).

In the symmetric property determination in step 11, one of the above three techniques is used.

According to a technique other than the above, however, all the three techniques may be used as the determination conditions, and, in a case where at least two of the conditions are satisfied, the profile of the difference data may be determined to have symmetric properties.

In step 12, the region determiner 25 determines the detected smudge candidate region to be se smudge candidate region.

In step 13, on the other hand, the region determiner 25 determines the detected smudge candidate region to be a true smudge candidate region.

Referring back to FIG. 6, in step 4 (S4), the region detector 24 deletes the smudge candidate region determined to be a false smudge candidate region by the region determiner 25, from the detected smudge candidate region.

As described above, according to this embodiment, in a case where a local positional shift is caused in an object due to local distortion, deformation, or the like of a print image, the false smudge candidate region resulting from this positional shill has unique characteristics in the difference image (difference data). Accordingly, it is possible to detect a false smudge candidate region, using difference data characteristics that are the characteristics of the difference data. Thus, even in a case where a positional shill occurs in an object in a print image, it is possible to appropriately distinguish a false smudge candidate region from a true smudge candidate region. As a result, it is possible to reduce the decrease in accuracy of inspection for smudges on printed materials.

Further, even in a case where the accuracy of position adjustment between the reference image and the inspection image is low, and there is a local positional shift, it is possible to appropriately detect a false smudge candidate region resulting from this positional shift. Because of this, by the inspection method according to this embodiment, it is possible to inspect printed materials for smudges, without performing strict position adjustment. In a case where strict position adjustment is performed, not only is the calculation load high, but also the calculation time is long. However, the techniques described in this embodiment can be realized by simple processes. Thus, the calculation load can be reduced, and the calculation time can be shortened.

Further, according to this embodiment, a false smudge candidate region determined by the region determiner 25 is deleted from a smudge candidate region detected by the region detector 24. As a result, it is possible to conduct inspection for smudges, using a true smudge candidate region. Thus, inspection accuracy can be increased.

Further, according to this embodiment, the profile of difference data is generated so as to extend across the element line EL (an element of the object), in accordance with a smudge candidate region. In this case, if the smudge candidate region results from a positional shift, symmetric properties appear in the profile of the difference data. Thus, it is possible to appropriately detect a false smudge candidate region, on the condition that symmetric properties appear in the profile of the difference data.

Further, according to this embodiment, the areas S1 and S2 of the closed regions defined by the zero difference line L0 as a boundary and the profile of the difference data are compared with each other. In a case where a smudge candidate region is attributable to a positional shift of an object, symmetric properties appear in the profile of the difference data. Accordingly, the areas S1 and S2 of these closed regions are substantially the same. Thus, it is possible to appropriately determine symmetric properties of the profile of the difference data by comparing the areas S1 and S2 of these closed regions.

Further, according to this embodiment, the peak height H1 of a smudge candidate region is compared with a peak height H2 existing in a region adjacent thereto via the element line EL. In a case where a smudge candidate region is attributable to a positional shift of an object, symmetric properties appear in the profile of the difference data. Accordingly, these peak heights H1 and H2 are substantially the same. Thus, it is possible to appropriately determine symmetric properties of the profile of the difference data by comparing these peak heights H1 and H2.

Further, according to this embodiment, the distance D1 from the base point at the intersection point between the profile of the difference data and the zero difference line L0, to the peak of a smudge candidate region is compared with the distance D2 from the base point to a peak existing in a region adjacent thereto via the element line EL. In a case where a smudge candidate region is attributable to a positional shift of an object, symmetric properties appear in the profile of the difference data. Accordingly, these distances D1 and D2 are substantially the same. Thus, it is possible to appropriately determine symmetric properties of the profile of the difference data by comparing these distances D1 and D2.

In this embodiment, one of those three conditions is used in determining symmetric properties. However, the region determiner 25 may determine symmetric properties in accordance with those three conditions, and detect symmetric properties in the profile of the difference data in a case where at least two of the conditions are satisfied. As symmetric properties are detected when two or more conditions are simultaneously satisfied, the determination result is highly reliable.

Also, in this embodiment, the range of generation of a difference data profile is determined from the size of a character as the object or the line width of the object. Thus, it is possible to generate a profile in an appropriate range. As a profile is generated in a limited range, the calculation load can be reduced. Further, as a profile is generated within a range suitable for the characteristics of the object, the profile is generated within a range that is sufficiently wide to determine symmetric properties, and thus, highly-reliable symmetric property determination can be made.

Further, in this embodiment, it is possible to accurately analyze the size or the line width of a character, using image information for forming a print image.

Also, in this embodiment, profiles that overlap with at least part of a smudge candidate region are generated in two different directions. Because of this, the influence of a positional shift always appears in one of the two directions. As a result, a false smudge candidate region can be appropriately detected.

The two different directions are preferably the normal direction F11 and the tangential direction F12 with respect to the element line EL, for example. With this arrangement, the influence of a positional shift always appears in one of the two directions, and thus, a false smudge candidate region can be appropriately detected.

Alternatively, the two different directions are preferably the two-dimensional directions F21 and F22 for defining an image, for example. With this arrangement, the influence of a positional shift always appears in one of the two directions, and thus, a false smudge candidate region can be appropriately detected. Furthermore, according to this method, profiles are generated in the two-dimensional directions F21 and F22 for defining an image, and there is no need to perform any complicated calculation to define directions. Thus, the calculation load can be reduced.

Although two directions are used in the example described in this embodiment, the directions of profile generation may be three or more different directions.

Also, in this embodiment, a smudge candidate region is detected, with the processing target region being the entire region of an image. However, the region detector 24 may automatically detect a region in which an object having lines as elements exists as the processing target region in the print image, and detect a smudge candidate region only from the processing target region. Thus, processing can be performed only in the region where a positional shift is likely to occur. As a result, the calculation load can be reduced, and the calculation time can be shortened. Alternatively, according to another technique, the region detector 24 may detect a smudge candidate region in a processing target region designated by the user. Thus, it is possible to perform processing that reflects the intention of the user.

From a similar viewpoint, the region determiner 25 may automatically detect a region in which an object having lines as elements exists in the print image as the processing target region, and determine whether a smudge candidate region included in the processing target region is a false smudge candidate region. Thus, processing can be performed only in the region where a positional shift is likely to occur. As a result, the calculation load can be reduced, and the calculation time can be shortened. Alternatively, according to another technique, the region determiner 25 may determine whether a smudge candidate region included in a processing target region designated by the user is a false smudge candidate region. Thus, it is possible to perform processing that reflects the intention of the user.

Second Embodiment

Figure 12A:
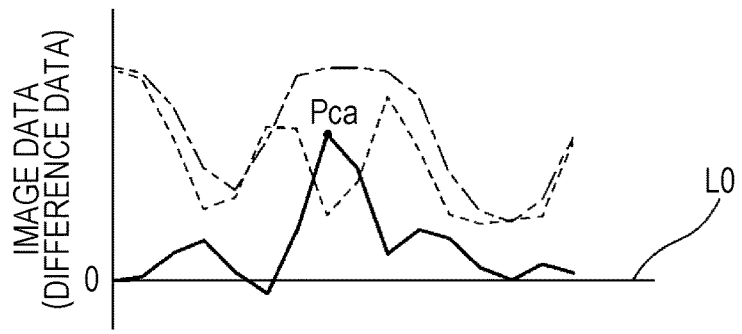
FIGS. 12A and 12B are diagrams for explaining an example of the respective profiles of image data and difference data.
Figure 12B:
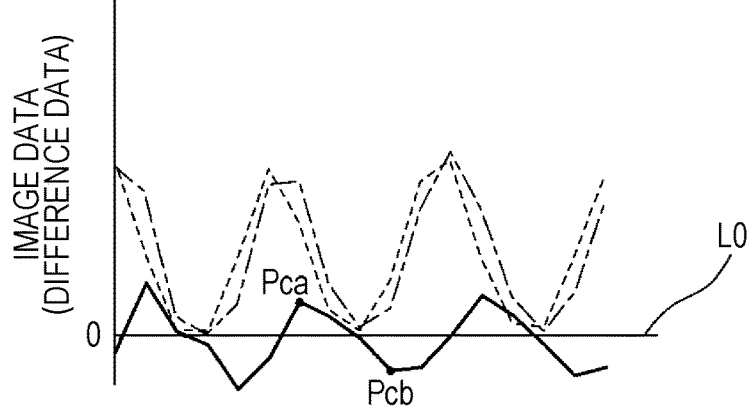
Figure 13A:
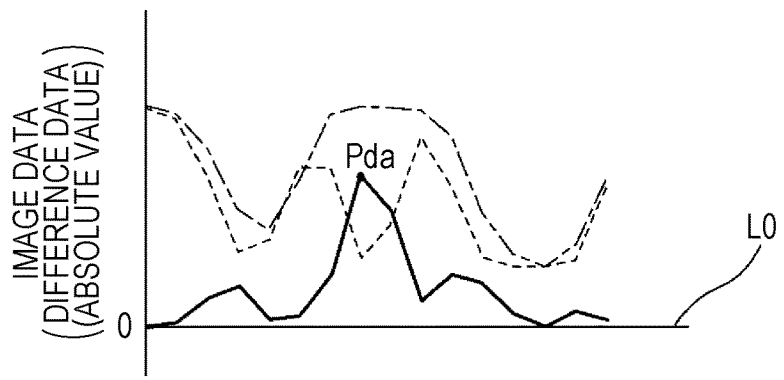
FIGS. 13A and 13B are diagrams for explaining an example of the respective profiles of image data and absolute value data.
Figure 13B:
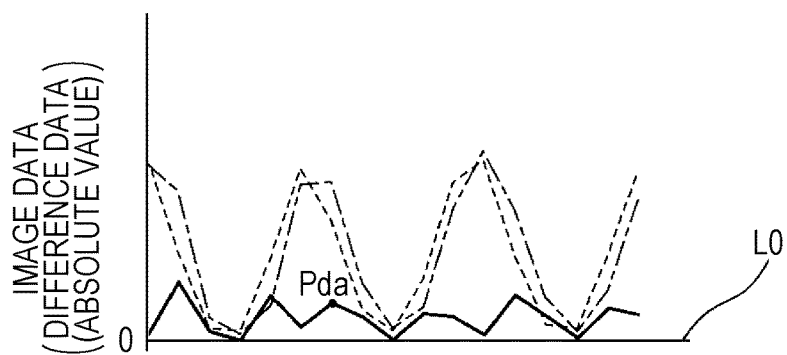

The following is a description of an image forming system 1 according to a second embodiment. The image forming system 1 according to the second embodiment differs from that of the first embodiment in the determination technique adopted by the region determiner 25. The same components as those of the first embodiment are not described herein, and the different aspects will be mainly described below. FIGS. 12A and 12B and FIGS. 13A and 13B are diagrams for explaining examples of the respective profiles of image data and difference data. FIG. 12A shows a profile relating to a true smudge candidate region. FIG. 12B shows a profile relating to a false smudge candidate region. Further, in each of FIGS. 12A and 12B, the dashed line represents the profile of the image data of an inspection image, the dot-and-dash line represents the profile of the image data of a reference image, and the solid line represents the profile of difference data. FIG. 13A shows a profile relating to a true smudge candidate region. FIG. 13B shows a profile relating to a false smudge candidate region. Further, in each of FIGS. 13A and 13B, the dashed line represents the profile of the image data of an inspection image, the dot-and-dash line represents the profile of the image data of a reference image, and the solid line represents the profile of absolute value data.

In this embodiment, the region determiner 25 compares the peak corresponding to a smudge candidate area with the profile of a region in the vicinity of the smudge candidate region in the profile of difference data. By doing so, the region determiner 25 determines whether the smudge candidate region is a false smudge candidate region. Hereinafter, two specific examples of determination techniques are described.

First, a technique that focuses on difference data is described. As can be seen from the comparison between FIGS. 12A and 12B, in the case of the false smudge candidate region, the profile of the difference data tends to have a peak Pca that corresponds to a smudge candidate region and protrudes in the positive direction, and a peak Pcb that exists in the vicinity of the peak Pca and protrudes in the negative direction. This is because the profile corresponding to the false smudge candidate region has a peak on the positive side and a peak on the negative side, with the boundary being the zero difference line L0. On the other hand, any peak on the negative side is not seen in the true smudge candidate region.

Therefore, the region determiner 25 determines whether the peak Pcb that is equivalent to the peak Pca corresponding to the smudge candidate region and exists on the negative side is seen in the vicinity of the peak Pca. In a case where the peak Pcb on the negative side is seen, the region determiner 25 determines the smudge candidate region to be a false smudge candidate region.

Next, a technique that focuses on the absolute value of difference data, or absolute value data, is described. As can be seen from the comparison between FIGS. 13A and 13B, in the case of the false smudge candidate region, the profile of the absolute value data tends to have a peak Pda that corresponds to a smudge candidate region, and a peak that exists in the vicinity of the peak Pda and is similar to the peak Pda. This is because the profile corresponding to the false smudge candidate region is a symmetrical waveform. On the other hand, such a tendency is not seen in the true smudge candidate region.

Therefore, the region determiner 25 determines whether the peak Pda corresponding to the smudge candidate region matches a peak existing in the vicinity of the peak Pda. For example, a determination range is set, with a certain margin for the peak height of the peak Pda being left in the positive direction and the negative direction. In a case where a vicinity peak exists in this determination range, the determination range is determined to be a range in which the two peaks match, or the two peaks are the same or can be regarded as the same. In a case where the peak Pda and the vicinity peak match, the region determiner 25 determines the smudge candidate region to be a false smudge candidate region.

As described above, according to this embodiment, it is possible to determine a false smudge candidate region through a simple process, taking advantage of the characteristics of the data of a region in the vicinity of a smudge candidate region. Thus, even in a case where a positional shift occurs in an object in a print image, it is possible to appropriately distinguish a false smudge candidate region from a true smudge candidate region. As a result, it is possible to reduce the decrease in accuracy of inspection for smudges on printed materials.

Further, even in a case where the accuracy of position adjustment between the reference image and the inspection image is low, and there is a local positional shift, it is possible to appropriately detect a false smudge candidate region resulting from this positional shift. Because of this, by the inspection method according to this embodiment, it is possible to inspect printed materials for smudges, without performing strict position adjustment. In a case where strict position adjustment is performed, not only is the calculation load high, but also the calculation time is long. However, the techniques described in this embodiment can be realized by simple processes. Thus, the calculation load can be reduced, and the calculation time can be shortened.

Further, it is also possible to combine a technique described in this embodiment with a technique described in the first embodiment. Specifically, as described above, the region determiner 25 first compares the peak corresponding to a smudge candidate area with the profile of a region in the vicinity of the smudge candidate region in the profile of difference data. By doing so, the region determiner 25 determines whether the smudge candidate region is a false smudge candidate region. The region determiner 25 then determines whether a smudge candidate region determined not to be a false smudge candidate region is a false smudge candidate region by a technique described in the first embodiment, which is a technique for detecting symmetric properties in the profile of difference data.

With this configuration, it is possible to apply a primary filter to a smudge candidate region and perform sieving, according to a determination technique using the difference data of a vicinity region. Accordingly, the number of smudge candidate regions to be subjected to symmetric property determination becomes smaller, and thus, the calculation load can be reduced.

Third Embodiment

The following is a description of an image forming system 1 according to a third embodiment. The image forming system 1 according to the third embodiment differs from that of the first embodiment or the second embodiment in that the generation status of a false smudge candidate region is used in determining an abnormality of the image forming apparatus 2 that has output a printed material. The same components as those of the first embodiment or the second embodiment are not described herein, and the different aspects will be mainly described below.

Figure 14:
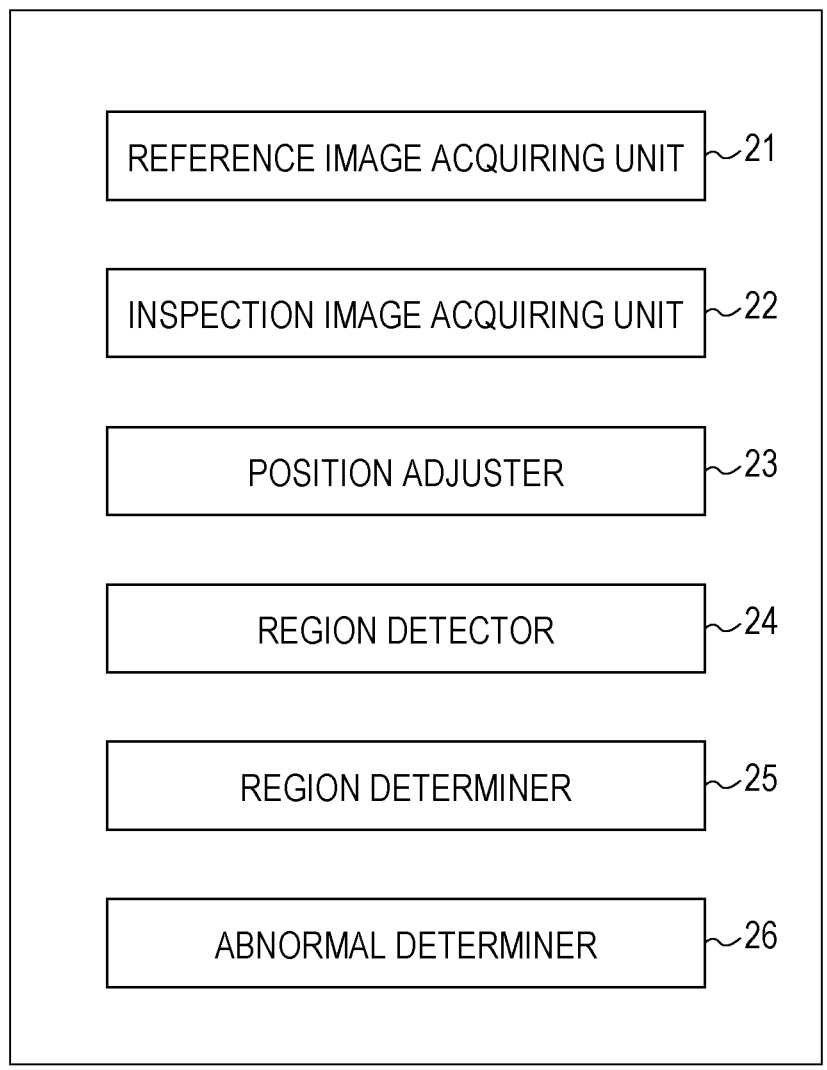
FIG. 14 is an explanatory diagram showing the functional configuration of a CPU.

FIG. 14 is an explanatory diagram showing the functional configuration of a CPU 11. In the image forming system 1 according to this embodiment, the CPU 11 further includes an abnormality determiner 26, in addition to the functions of the CPU 11 according to the first embodiment or the second embodiment. The abnormality determiner 26 has a function of determining whether it is necessary to repair the image forming apparatus 2 that has formed a print image on a printed material.

It is widely known that a positional shift occurs in an object in a print image, because the image forming apparatus 2 deteriorate over time and affects the image formation process and the conveyance process. That is, in a case where a positional shift indicates deterioration of the image forming apparatus 2, it is possible to determine an abnormality (deterioration) of the image forming apparatus 2 by a back calculation from the status of occurrence of the positional shift.

For example, in a process of successively inspecting printed materials that are successively output from the image forming apparatus 2, if a false smudge candidate region has appeared at the same position (including approximately the same position) on printed materials at least a predetermined number of times, it is conceivable that there is some abnormality in the image forming apparatus 2. Alternatively, in a case where a false smudge candidate region has appeared in one printed material at least a predetermined number of times, it is conceivable that there is some abnormality in the image forming apparatus 2. Therefore, the abnormality determiner 26 determines whether it is necessary to repair the image forming apparatus 2, in accordance with the generation status of a false smudge candidate region determined by the region determiner 25. Here, the generation status of a smudge candidate region may be the number of times generation has occurred and the number of generated regions, but may be some other items.

Alternatively, in the process of successively inspecting printed materials, the abnormality determiner 26 measures the number of false smudge candidate regions that have appeared on each printed material. In a case where an increasing trend, such as a rapid increase or a slow increase in the number of false smudge candidate regions, is detected, the abnormality determiner 26 may determine that a repair is necessary.

According to yet another technique, in the process of successively inspecting printed materials, the abnormality determiner 26 calculates the periodicity of positional shifts in accordance with a result of calculation performed by the region determiner 25. The abnormality determiner 26 may determine whether a repair is necessary, in accordance with the periodicity. Specifically, a region relating to a certain character is extracted from a region determined to a false smudge candidate region. The character to be extracted is preferably a character in which a positional shift easily occurs, because of its thickness and shape.

The abnormality determiner 26 calculates periodicity of positional shifts in a specific character located at the same position in each printed material. In a case where an increasing trend, such as a rapid increase or a slow but continuous increase in the positional shift amount, is detected, the abnormality determiner 26 determines that a repair is necessary. Alternatively, the abnormality determiner 26 may determine that a repair is necessary, in a case where the positional shift amount repeatedly increases and decreases at regular intervals.

Note that, in calculating a positional shift of an object and the periodicity of the positional shift, the abnormality determiner 26 uses a result of calculation performed by the region determiner 25. This calculation result is equivalent to the profile of the image data of the reference image and the profile of the image data of the inspection image. However, the profile of difference data may be used as the calculation result.

Further, the abnormality determiner 26 preferably holds feature data that associates the result of the calculation performed by the region determiner 25 with the periodicity. Thus, this feature data can be used when the image forming apparatus 2 is repaired. As a result, the abnormality occurrence situations can be grasped, and thus, the workability at the time of the repair can be increased. Further, as this feature data is used, the abnormality of the image forming apparatus 2 can be analyzed.

The abnormality determiner 26 can determine whether the image forming apparatus 2 is in an abnormal state by analyzing the feature data, and then automatically determine whether the image forming apparatus 2 is to be stopped and repaired. For example, in a case where an increasing trend, such as a rapid increase or a slow but continuous increase in the positional shift amount, is detected as a result of the feature data analysis, the abnormality determiner 26 determines that the image forming apparatus 2 is in an abnormal state. In doing so, the abnormality determiner 26 also determines the level of the abnormal state (the degree of the abnormal state) from the feature data. After determining that the image forming apparatus 2 is in an abnormal state, the abnormality determiner 26 refers to a stopping condition set by the user. The stopping condition are the condition specifying at which abnormal state level the image forming apparatus 2 should be when the image forming apparatus 2 is stopped. The stopping condition is set beforehand by the user. The abnormality determiner 26 compares the level of the abnormal state of the image forming apparatus 2 with the stopping condition. If the abnormal state level satisfies the stopping condition, the abnormality determiner 26 stops the image forming apparatus 2.

Stopping the image forming apparatus 2 leads to a decrease in productivity. Therefore, even if an abnormality has occurred, stopping the image forming apparatus 2 readily does not match the user's intention in some cases. Furthermore, the abnormal state of the image forming apparatus 2 varies in degree. The abnormal state of the image forming apparatus 2 requires an urgent repair in some cases, and does not require an urgent repair in other cases. In view of this, the image forming apparatus 2 is not stopped just because the image forming apparatus 2 is in an abnormal state. Instead, a check is automatically made to determine whether to stop and repair the image forming apparatus 2, with its abnormal state being taken into consideration. In this manner, a user-friendly system can be provided.

The abnormality determiner 26 can further predict the time for a repair for each of the components of the image forming apparatus 2, in accordance with the feature data and component information indicating the features of the abnormality. In a case where there is an abnormality in a component of the image forming apparatus 2, a unique tendency corresponding to the abnormality of the component might appear in the feature data. Examples of such components include a conveyance roller, an exposure device, an intermediate transfer belt, and a photosensitive drum. Therefore, it is possible to predict the time for a repair for a component, by analyzing the feature data and determining the unique tendency corresponding to the abnormality of the component. In this manner, a repair can be made in an early stage, and thus, it is possible to prevent an unexpected situation where the image forming apparatus 2 abruptly stops.

As described above, according to this embodiment, a check is made to determine whether the image forming apparatus 2 needs repairing, from a result of calculation performed by the region determiner 25. Thus, a check can be made to determine whether the image forming apparatus 2 needs repairing, while a result of calculation performed by the region determiner 25 is effectively used in a different manner.

Although image forming systems according to embodiments of the present invention have been described so far, the present invention is not limited to the above described embodiments, and various modifications may be made to them within the scope of the invention. Not only the image forming systems but also the inspection apparatuses included in these image forming systems, the above described inspection methods, and programs for causing a computer to implement the inspection methods may be part of the present invention. Furthermore, a computer readable recording medium storing these programs is also part of the present invention.

In this embodiment, the CPU that controls the entire image forming system is designed to control both the image forming apparatus and the inspection apparatus. However, the inspection apparatus may include a component such as a CPU, and conduct inspection in an independent manner.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inspection apparatus that inspects a printed material for a smudge, in accordance with an inspection image formed by reading the printed material, a print image being formed on the printed material, and the inspection apparatus comprising:
   a hardware processor that:
      performs position adjustment between a reference image serving as an inspection standard for the print image, and the inspection image;
      detects a region presumed to be a smudge on the printed material as a smudge candidate region, in accordance with a difference image generated from the reference image and the inspection image after the position adjustment; and
      determines whether the smudge candidate region is a false smudge candidate region resulting from a positional shift of an object in the print image, in accordance with the smudge candidate region detected by the hardware processor and difference data characteristics of the difference image,
   wherein in determining whether the smudge candidate region is the false smudge candidate region, the hardware processor generates a difference data profile extending across an element of the object in accordance with the smudge candidate region, and, when the difference data profile has symmetric properties, determines the smudge candidate region to be the false smudge candidate region.

2. The inspection apparatus according to claim 1, wherein the hardware processor deletes a false smudge candidate region determined by the hardware processor from the detected smudge candidate region.

3. The inspection apparatus according to claim 1, wherein the hardware processor:
   determines whether the smudge candidate region is the false smudge candidate region, by comparing a peak corresponding to the smudge candidate region with a profile of a region near the smudge candidate region in the difference data profile; and
   determines symmetric properties of the difference data profile for a smudge candidate region determined not to be the false smudge candidate region.

4. The inspection apparatus according to claim 1, wherein the hardware processor determines symmetric properties of the difference data profile, in accordance with an area comparison between closed regions defined by the difference data profile, with a zero difference line being a boundary.

5. The inspection apparatus according to claim 1, wherein the hardware processor determines symmetric properties of the difference data profile, in accordance with a comparison between a peak height corresponding to the smudge candidate region and a peak height existing in a region adjacent to the smudge candidate region in the difference data profile.

6. The inspection apparatus according to claim 1, wherein the hardware processor determines symmetric properties of the difference data profile, in accordance with a comparison between a distance from a base point to a peak corresponding to the smudge candidate region and a distance from the base point to a peak existing in a region adjacent to the smudge candidate region in the difference data profile, the base point being an intersection point between the difference data profile and a zero difference line.

7. The inspection apparatus according to claim 1, wherein the hardware processor determines that the difference data profile has symmetric properties, when at least two of three conditions are satisfied, the three conditions comprising:
   a first condition using an area comparison between closed regions defined by the difference data profile, with a zero difference line being a boundary;
   a second condition using a comparison between a peak height corresponding to the smudge candidate region and a peak height existing in a region adjacent to the smudge candidate region in the difference data profile; and
   a third condition using a comparison between a distance from a base point to a peak corresponding to the smudge candidate region and a distance from the base point to a peak existing in a region adjacent to the smudge candidate region in the difference data profile, the base point being an intersection paint between the difference data profile and the zero difference line.

8. The inspection apparatus according to claim 1, wherein the hardware processor determines whether the smudge candidate region is the false smudge candidate region, by comparing a peak corresponding to the smudge candidate region with a profile of a region near the smudge candidate region in the difference data profile.

9. The inspection apparatus according to claim 1, wherein the hardware processor determines a range of generation of the difference data profile, in accordance with one of a size of a character as the object and a line width of the object.

10. The inspection apparatus according to claim 9, wherein the hardware processor analyzes the one of the size of the character and the line width of the object, in accordance with image information for forming the print image.

11. The inspection apparatus according to claim 1, wherein the hardware processor generates the difference data profile in at least two different directions, the difference data profile overlapping with at least part of the smudge candidate region.

12. The inspection apparatus according to claim 11, wherein the object has a line as an element, and the at least two different direction include a normal direction and a tangential direction with respect to the line.

13. The inspection apparatus according to claim 11, wherein the at least two different directions include two-dimensional directions for defining an image.

14. The inspection apparatus according to claim 1, wherein the hardware processor automatically detects a processing target region that is a region in which an object having a line as an element exists in the print image, and detects the smudge candidate region in the processing target region, or detects the smudge candidate region in a processing target region designated by a user.

15. The inspection apparatus according to claim 1, wherein the hardware processor automatically detects a processing target region that is a region in which an object having a line as an element exists in the print image, and determines whether the smudge candidate region included in the processing target region is the false smudge candidate region, or determines whether the smudge candidate region included in a processing target region designated by a user is the false smudge candidate region.

16. The inspection apparatus according to claim 1, wherein the hardware processor determines whether it is necessary to repair an image forming apparatus that has formed the print image on the printed material, in accordance with a generation state of the false smudge candidate region.

17. The inspection apparatus according to claim 16, wherein the hardware processor calculates a periodicity of the positional shift in accordance with a result of a calculation performed by the hardware processor, and determines, from the periodicity, whether a repair is necessary.

18. The inspection apparatus according to claim 17, wherein the hardware processor holds feature data associating the result of the calculation performed by the hardware processor with the periodicity.

19. The inspection apparatus according to claim 18, wherein the hardware processor determines whether the image forming apparatus is in an abnormal state by analyzing the feature data, and automatically determines whether to stop and repair the image forming apparatus.

20. The inspection apparatus according to claim 19, wherein the hardware processor predicts a time for a repair for each of components of the image forming apparatus, in accordance with the feature data and component information indicating features of an abnormality.

21. An image forming system having a function of inspecting a printed material for a smudge, the image forming system comprising:
a printer that forms a print image on a paper sheet, and outputs a printed material on which the print image is formed;
an image reader that reads the printed material output from the printer, and generates an inspection image; and
a hardware processor that:
performs position adjustment between a reference image serving as an inspection standard for the print image, and the inspection image;
detects a region presumed to be a smudge on the printed material as a smudge candidate region, in accordance with a difference image generated from the reference image and the inspection image after the position adjustment; and
determines whether the smudge candidate region is a false smudge candidate region resulting from a positional shift of an object in the print image, in accordance with the smudge candidate region detected by the hardware processor and difference data characteristics of the difference image,
wherein in determining whether the smudge candidate region is the false smudge candidate region, the hardware processor generates a difference data profile extending across an element of the object in accordance with the smudge candidate region, and, when the difference data profile has symmetric properties, determines the smudge candidate region to be the false smudge candidate region.

22. An inspection method for inspecting a printed material for a smudge in accordance with an inspection image formed by reading the printed material on which a print image is formed, the inspection method comprising:
performing position adjustment between a reference image serving as an inspection standard for the print image, and the inspection image;
detecting a region presumed to be a smudge on the printed material as a smudge candidate region, in accordance with a difference image generated from the reference image and the inspection image after the position adjustment; and
determining whether the smudge candidate region is a false smudge candidate region, in accordance with the smudge candidate region and difference data characteristics of the difference image,
wherein the determining comprises generating a difference data profile extending across an element of the object in accordance with the smudge candidate region, and, when the difference data profile has symmetric properties, determining the smudge candidate region to be the false smudge candidate region.

23. A non-transitory recording medium storing a computer readable program for causing a computer to implement an inspection method for inspecting a printed material for a smudge in accordance with an inspection image formed by reading the printed material on which a print image is formed, the program causing the computer to execute:
performing position adjustment between a reference image serving as an inspection standard for the print image, and the inspection image;
detecting a region presumed to be a smudge on the printed material as a smudge candidate region, in accordance with a difference image generated from the reference image and the inspection image after the position adjustment; and
determining whether the smudge candidate region is a false smudge candidate region, in accordance with the smudge candidate region and difference data characteristics of the difference image,
wherein the determining comprises generating a difference data profile extending across an element of the object in accordance with the smudge candidate region, and, when the difference data profile has symmetric properties, determining the smudge candidate region to be the false smudge candidate region.

* * * * *